United States Patent
Dega

[11] 3,904,211
[45] Sept. 9, 1975

[54] ROTARY FACE SEAL

[75] Inventor: Robert L. Dega, Mount Clemens, Mich.

[73] Assignee: General Motors Corporation, Detroit, Mich.

[22] Filed: Dec. 3, 1973

[21] Appl. No.: 421,422

[52] U.S. Cl. .............. 277/32; 277/88; 415/170 A
[51] Int. Cl. ............................................. F16k 15/40
[58] Field of Search ............ 277/42, 88, 35, 36, 38, 277/39, 40, 43, 89, 90, 93 R, 32; 264/230, 249, 264; 415/170 A

[56] References Cited
UNITED STATES PATENTS

| | | | |
|---|---|---|---|
| 2,695,799 | 11/1954 | Chambers et al. | 277/42 |
| 2,985,472 | 5/1961 | Schoenrock | 277/42 |
| 3,597,372 | 8/1971 | Cook | 264/230 |
| 3,619,455 | 11/1971 | Clement et al. | 264/230 |
| 3,800,396 | 4/1974 | Puchner | 264/230 |

Primary Examiner—Richard E. Aegerter
Assistant Examiner—L. Footland
Attorney, Agent, or Firm—Peter D. Sachtjen

[57] ABSTRACT

A rotary face seal for the space between a stationary housing and a rotatable shaft extending therethrough uses a heat shrinkable polytetrafluoroethylene tube to form a secondary sealing boot that prevents leakage around a spring biased primary sealing face. The boot restrains relative rotation of the sealing face with respect to the shaft, damps out torsional vibration under high cyclic slip-stick conditions, resists embrittlement and cracking, protects the spring and the relatively axially sliding surfaces from deposit buildup, allows hydrostatic balancing of the pressures on the sealing face, and contains all rotating components in unitized assembly without supplemental stacking or locking tabs.

1 Claim, 3 Drawing Figures

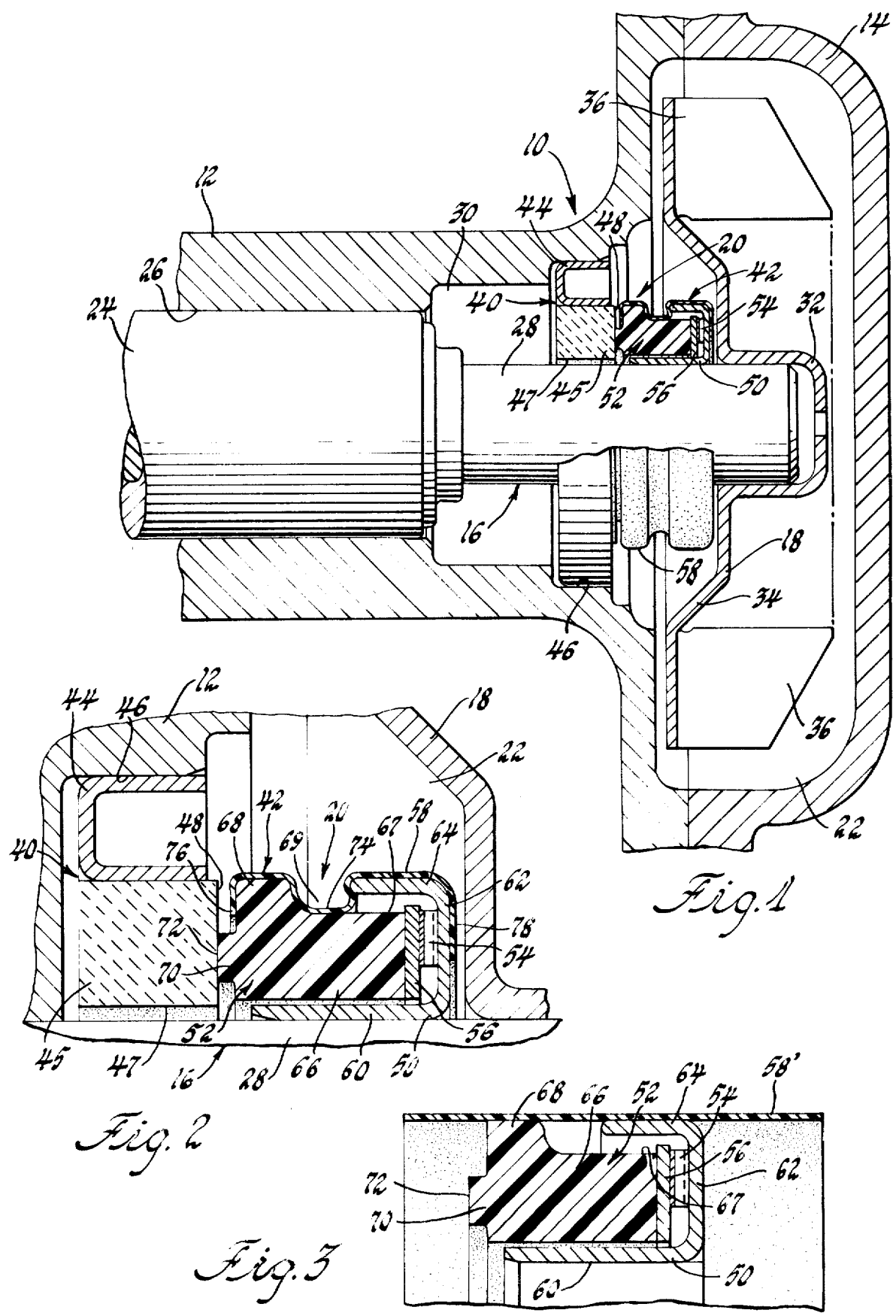

ROTARY FACE SEAL

The present invention relates to fluid seals and, in particular, to a rotary face seal wherein the axially slidable primary sealing face is limitedly flexibly circumferentially and axially connected to the shaft mounted seal cup by means of a heat shrinkable secondary sealing boot.

Rotary face seals are used to prevent the flow of fluid from a fluid chamber through the annular space between a stationary housing and a rotatable shaft. A typical face seal such as used in automotive water pumps includes a stationary sealing assembly mounted on the housing and a rotatable sealing assembly carried by the shaft. The stationary sealing assembly includes an annular ceramic seal head connected to the housing by an intermediate retainer. The rotatable sealing assembly includes a shaft mounted seal cup and a plastic or carbon sealing ring having a flat projecting annular surface which engages an axially facing surface of the sealing head. An elastomeric boot is sealingly connected between the seal cup and the sealing ring. The boot permits axial travel of the sealing ring to accommodate axial parts misalignments while providing a secondary seal between the sealing ring and the seal cup. A compression spring operatively connected between the seal cup and the sealing ring axially biases the sealing face into contact with the seal head.

In rotary face seals of the above-described type, the secondary sealing system including the elastomeric boot is a source of high failure in automotive water pump applications. The ethylene-glycol-water-oil environment and the high heat generation at the seal face transmitted to the elastomeric boot causes boot failure due to embrittlement and cracking. Secondly, the spring and the boot are typically weak from a standpoint of restraining rotation of the sealing ring. Therefore, the seal cup and the sealing ring must be provided with loosely engaging interlocking indentations and lugs. However, high cyclic slip-stick conditions at the sealing face generate a high inertial loading on these restraining lugs and, eventually, seal failure results due to sealing ring cracking and lug wear. A further source of failure is the inherent hydrostatic overbalance on the sealing face wherein the fluid pressure will additionally load the sealing ring against the seal head. This causes increased frictional wear and premature failure.

The present invention overcomes the above-noted defects of conventional rotary face seals by using a heat shrinkable plastic boot to effect the secondary seal, and to circumferentially and axially restrain the components. This boot, preferably polytetrafluoroethylene, is unaffected by most fluids, in particular the aforementioned ethylene-glycol-water-oil environment of automotive water pumps. This material is usable at a high temperature of around 500°F whereas the nitrile boot presently employed is usable at only slightly over 200°F, a temperature often exceeded in the engine cooling system. This material is thus not susceptible to the cracking or embrittlement common to the former compounds. The heat shrinkable tube is initially slightly larger in diameter and axially longer than the stacked relationship of the sealing ring, seal cup, and the spring. These components are placed in assembled relationship and the tube inserted thereover. Dry heat is applied to the tube causing the tube to shrink and assume a shape axially and radially conforming to the outer surfaces of the rotating components.

In the present design, an outer annular groove is provided between the exterior surfaces of the seal cup and the sealing ring. The tube thus conforms to the components with a generally U-shape annular flex section. The annular unsupported radial sections operate as flexible section to accommodate axial parts misalignment. The degree of hydrostatic balance on the sealing face can be controlled by changing the depth of the groove to achieve whatever positive or negative differential is desired. The boot material has a high modulus of elasticity as compared to prior compounds and permits a construction that does not require the restraining lugs above mentioned. The boot also torsionally damps out vibration due to stick-slip. The present rotary face seal thus provides a durable and effective secondary boot seal which prevents leakage around the primary sealing face, positive torsional damping and circumferential restraint of the seal face, protection against deposit buildup on the relatively slidable surfaces, accommodation of hydrostatic balancing on the sealing face, and retention of all rotating component parts in unitized assembly without supplemental locking means.

The above and other features of the present invention will be apparent to one skilled in the art upon reading the following detailed description, reference being made to the accompanying drawings illustrating a preferred embodiment of the present invention in which:

FIG. 1 is a fragmentary cross-sectional view of a water pump incorporating a rotary face seal between the pump housing and the pump impeller shaft, FIG. 2 is an enlarged cross-sectional view showing the rotary face seal in operative relationship, and FIG. 3 is a fragmentary cross-sectional view of the rotating sealing components prior to heat shrinkage of the sealing boot.

Referring to FIG. 1, there is shown an automotive water pump assembly 10 comprising a two-piece housing including members 12 and 14, a shaft 16, an impeller 18, and a rotary face seal 20. The interior surfaces of the housing members 12 and 14 exterior of the shaft 16 and the face seal 20 define an annular pumping cavity 22 which receives and discharges engine coolant as directed by the pump 10 through ports, not shown. The engine coolant typically comprises a mixture of ethylene-glycol-water and sometimes oil. The shaft 16 is journalled at one end in a bearing 24 mounted in an axial bore 26 in the housing member 12. The shaft 16 projects beyond the bearing 24 outwardly through the housing where it is connected to a conventional pulley (not shown) driven by a belt connected to the engine crankshaft pulley. The free end 28 of the shaft 16 projects into the cavity 22 through a passage 30 coaxial with the bore 26.

The impeller 18 is a sheet metal stamping having a central cup-shaped hub 32 pressed over the outer portion of the free end 28 and an outwardly extending radial flange 34 terminating at the outer edge thereof with axially directed impeller blades 36. Upon rotation of the shaft 16 as driven by the engine, the impeller 18 is rotated to pump fluid through the ports of the cavity 22 in the conventional manner.

The space between the passage 30 and the outer surface of the shaft 16 is sealed by the aforementioned rotary face seal 20. The face seal 20 comprises a stationary sealing assembly 40 and a rotating sealing assembly 42.

The stationary assembly 40 includes an outer stamped sheet metal seal head retainer 44 and an inner annular seal head 45. The retainer 44 is U-shaped in cross section and has an outer annular surface press fitted within a counter bore 46 formed coaxially with the bore 26. The seal head 45 is formed of a ceramic material and has generally square a cross section. The seal head 45 had a central aperture 47 through which the free end 28 of the shaft projects into the cavity 22. The seal head 45 has an outer annular surface fittedly engaging and bonded to the inner surface of the retainer 44. A flat axially facing annular sealing surface 48 is engaged by the rotating sealing assembly 42.

The rotating assembly 42 comprises a seal cup 50 carried by the shaft 16 and a sealing ring 52 which is biased against the seal head 45 by means of a wave spring 54 acting on a thrust washer 56 engaging the rear surface of the seal ring 52. The aforementioned components 50, 52, 54 and 56 are held together in assembled relationship by a secondary heat shrinkable sealing boot 58.

Referring to FIG. 2, the seal cup or holder 50 is a sheet metal stamping having an inner cylindrical hub 60 press fitted over the shaft free end 28 and a radially extending annular flange 62 outwardly terminating with a reversely directed cylindrical rim 64.

The sealing ring 52 comprises a cylindrical body 66 having an outer cylindrical surface 67 frontally terminating with an enlarged annular shoulder 68. The shoulder 68 has an outer diameter substantially the same as the outer diameter of the rim 64. The shoulder 68 is axially spaced from the front edge of the rim 64 and with the surface 67 defines an intermediate outwardly opening groove 69. A projecting annular sealing land 70 is formed at the front end of the sealing ring 66. The sealing land 70 has a flat annular sealing surface 72 adapted to engage the surface 48 of the seal head 45 at a sealing interface. The sealing ring 52 is formed of a carbon or plastic material which is softer than the ceramic sealing head 45. Accordingly, this surface 72 is lapped in engagement with surface 48 to effect a positive high pressure seal therewith. The combination of the secondary seal provided by the boot 58, as hereinafter explained in greater detail, and the primary seal between the surfaces 72 and 48 prevent passage of engine coolant from the cavity 22 through the annular space between the inner surface of the seal head 45 and the outer surface of the free end of the shaft 16.

The wave spring 54 is a conventional circumferentially convoluted stamping. The thrust washer 56 as biased by the wave spring 54 bears directly against the rear surface of the sealing ring 52. In assembly position, the spring 54 is compressed to provide an axial biasing force for urging the surface 72 into sealing engagement with the surface 48.

Referring to FIG. 3, the sealing boot 58 is initially a cylindrical tube 58'. The tube 58' is formed of a heat shrinkable material such as polytetrafluoroethylene, available as Teflon. The tube 58' extends axially beyond the end surfaces of the sealing ring 52 and the flange 62. The tube 58' has an inner diameter about 0.006 in. greater than the outer diameter of the shoulder 68 and the rim 64. The tube 58' has a 4 mil thickness and extends substantially equal distances beyond the ends of the rotating sealing assembly 42. In a conventional manner, dry heat is applied to the tube causing it to shrink and conform to the outer surfaces of the rotating assembly components. Upon application of the heat, an inner flex section 74 is established tightly conforming to the outwardly opening annular groove 69. The ends of the boot 76 and 78 conform to the outer axially facing end surfaces of the sealing ring 52 and the seal cup flange 62.

The shrunk Teflon boot 58 has a high modulus of elasticity and its torsional stiffness securely circumferentially indexes the seal ring 52 with respect to the seal cup 50 while flexing sufficiently to damp torsional vibrations. However, the radially unsupported portions flex section 74 allows limited axial movement of the sealing ring 52 with respect to the flange 62 to accommodate axial parts misalignment. In assembly, the stationary sealing assembly 40 is pressed within the bore 26 to a predetermined location. The seal cup 50 is then pressed over the free end 28 of the shaft 16 and into engagement with the seal head 45 until surfaces 48 and 72 engage and the spring 54 is compressed. Thereat, the primary sealing surfaces 48, 72 effect the primary sealing barrier at the interface against the passage of fluid from the cavity 22 outwardly along the shaft surface. The boot 58 provides a secondary seal and prevents the flow of coolant between the sealing ring 52 and the seal cup 50. To prevent fluid pressure in the cavity 22 from increasing the biasing at the primary sealing interface, the outer surface 67 of the sealing ring is chosen to have a diameter at the groove 69 which establishes the desired hydrostatic balance on the seal ring. A positive differential or a negative differential due to fluid pressure can thus be established by proper selection of the outer surface diameter.

Thus, in assembly the secondary sealing boot restrains the sealing ring 52 from rotating and damps out any torsional vibration due to cyclic slip-stick at the seal face. The design of the flex section 74 allows for the aforementioned hydrostatic balancing of the seal face and the boot prevents material contaminant buildup on the relatively sliding parts of the rotating seal assembly.

Although only one form of this invention has been shown and described, other forms will be readily apparent to those skilled in the art. Therefore, it is not intended to limit the scope of this invention by the embodiment selected for the purpose of this disclosure but only by the claims which follow.

What is claimed is:

1. In a motor vehicle water pump having a housing defining a pumping cavity and a rotatable shaft extending into the cavity and carrying an impeller for pumping coolant therethrough, a rotary face seal for sealing the space between the housing and the shaft for preventing the leakage of coolant from the cavity comprising:

an annular retainer fixedly connected to the housing;
an annular ceramic seal head carried by the retainer and through which the shaft projects, said seal head having a flat radial sealing surface disposed in the cavity coaxial with the shaft;
a seal cup having a cylindrical hub carried by the shaft and axially spaced from the seal head and a radial flange extending outwardly from one end of the hub and terminating with a reversely directed cylindrical rim partially overlying the hub;

an annular sealing ring formed of a material softer than the seal head, said sealing ring being loosely received over the hub and axially slidable between the hub and the rim, said sealing ring having a cylindrical body with an enlarged annular shoulder at the end remote from the flange, said shoulder being axially spaced from the rim to define therebetween a groove, the depth of the groove being selected to provide a predetermined hydrostatic balancing on the ring under coolant pressure;

an annular axially projecting seal land on the end surface of the body, said land having a flat surface engageable with the sealing surface of said seal head;

a compression spring operatively connected between said sealing ring and said flange, said spring axially biasing said seal land into sealing engagement with the sealing surface of said seal head;

and a cylindrical sealing boot formed of a heat shrinkable material, said boot conforming to the outer contours of the shoulder, the groove, and the rim, said boot establishing a flexible section at said groove which permits limited axial movement of the ring to accommodate parts misalignment and torsionally interconnects said sealing ring and said seal cup in unitized assembly, said boot preventing leakage between said seal cup and said sealing ring and restraining relative rotation of said sealing ring relative to said seal cup while torsionally yielding to damp out vibrations.

* * * * *